Patented Mar. 12, 1940

2,193,336

UNITED STATES PATENT OFFICE 2,193,336

SOLUTION OF ALKALI METAL SALTS OF PHENOLS

Hans Z. Lecher, Plainfield, and Mario Scalera, Somerville, N. J., assignors, by mesne assignments, to American Cyanamid Company, New York, N. Y., a corporation of Maine No Drawing. Application July 27, 1937, Serial No. 155,922

12 Claims. (Cl. 260—621)

This invention relates to solutions of alkali metal salts of phenols, both mononuclear and polynuclear, in inert organic solvents.

Alkali metal salts of phenols are not soluble in many classes of organic solvents. As a matter of fact, they have so far only been dissolved in water, alcohols and phenols. However, solvents of this type are too reactive for reactions which require inert and dry solutions. This had rendered many reactions with alkali salts of phenols difficult or unsatisfactory. Particularly such solutions could not be successfully used in the production of corresponding hydroxy acids by the Kolbe synthesis.

The first inert solvents for alkali metal salts of phenols were disclosed in our copending application, Serial No. 99,486. They belonged to a certain group of heterocyclic ethers.

The present invention employs a new class of inert and cheap solvents having the same action and describes processes for obtaining solutions of alkali phenolates in said solvents which solutions may or may not be partly or completely dehydrated.

These new solvents belong to the group of pyridine and compounds having condensed pyridine rings and their homologs. As examples may be mentioned pyridine itself, the picolines, the lutidines, the collidines, quinoline, quinaldine, lepidine, isoquinoline, etc. Mixtures of such compounds such as those directly obtained from the acid soluble coal tar fraction may also be used and are, as a matter of fact, the cheapest solvents of this group.

The most important mononuclear phenol, the alkali metal salt of which may be dissolved according to the present invention is, of course, phenol itself; while in the polynuclear series, alpha and particularly beta-naphthol rank first. The invention, however is not limited to these compounds but is generally usable with any phenol in which there are not sufficient polar groups to render its alkali salts insoluble in the solvents of the present invention. Examples of such other phenols are the cresols, the chlorophenols, guaiacol, hydroxy anthracenes, hydroxy biphenyls, hydroxy carbazoles, hydroxy benzocarbazoles, ar-hydroxy tetralines, arylides of 2-hydroxy-3-naphthoic acid; also bivalent phenols as the dihydroxy benzenes, the dihydroxy naphthalenes, and the dihydroxy anthracenes may be used.

The solubility of of all these alkali salts is, of course, not the same in any one of the solvents of the present invention, and the solubility of any given alkali salt in different solvents of the present invention will obviously also vary. In most cases, the sodium salts are more soluble than the potassium salts and the monoalkali salts of bivalent phenols are more soluble than the dialkali salts. In many cases the solubility at lower temperatures is not sufficient and solutions must be prepared at higher temperatures. In some cases this necessitates using some of the higher boiling heterocyclic solvents of the present invention. In each case, of course, the solvent best suited for the particular conditions will be chosen.

The solutions of the present invention may be prepared in many ways. Thus, e. g., the alkali metal salt of the phenol may be dissolved in the solvent. This procedure, however, is not the preferred one as it is one of the objects of the present invention to prepare the solutions without isolating the alkali metal salt first.

The simplest procedure consists in dissolving the phenol in the solvent, adding alkali hydroxide in solid form and agitating until complete solution is accomplished. Usually the reaction is smooth and exothermic. One molecule of water for each equivalent of phenol employed is formed.

If, as is frequently the case, an anhydrous solution is desired, the water may be removed by using an excess of the alkali hydroxide. Upon warming, the excess forms a lower layer with the water removed and the upper layer may be siphoned off. Other dehydrating agents as e. g. lime or calcium carbide, may be used.

A more simple and very efficient method of dehydrating the solutions removes the water by distillation with or without distilling off a portion of the solvent; e. g., pyridine and alpha picoline form with water azeo-tropic mixtures of a lower boiling point than the pure solvent has and therefore the water can be completely removed by distillation together with a part of the solvent. The solvents thus removed may be gradually replaced by dry solvent if it is not desired to concentrate the solution too much. Wet solvents of this class are effectively dried by refluxing them over quicklime and distilling them from the lime directly. When solvents with a higher boiling point are used, the water may be completely removed by distillation without distilling any of the solvent.

In the case of phenols which are commercially prepared by the alkali fusion of the corresponding sulfonic acids, a simple method of obtaining a solution of their alkali metal salts consists of extracting the cooled and ground salt with the desired solvent. This is a particularly attractive procedure, for it permits the separation of the alkali phenolates solution from the inorganic by-products (sulfite and alkali hydroxide) which are not soluble in the solvents of the present invention.

Most alkali phenolates are somewhat more soluble in the solvents of the present invention when there is one equivalent of water present. Thus, e. g. it is possible to obtain a 30% solution of potassium betanaphtholate in pyridine containing one equivalent of water at room temperature. However, a 25% anhydrous solution in pyridine can be obtained only near the boiling point and it precipitates the salt on cooling. This behavior is probably to be explained by the formation of a highly soluble monohydrate. Sodium betanaphtholate forms a very soluble monohydrate, but a sparingly soluble trihydrate, and this trihydrate may be precipitated from the naphthol solutions by the addition of the amount of water required for its formation.

Solutions whether anhydrous or not are included in the broad scope of the present invention.

While the invention is not limited to solutions which are completely anhydrous, anhydrous solutions are preferable for many reactions, particularly for the production of hydroxy acids by the Kolbe synthesis. However, this reaction is not a subject of the present application but of our copending application Serial No. 156,704, filed July 31, 1937.

The invention will be described in greater detail in conjunction with the following examples. It should be understood that these are illustrative and are not intended to limit the invention. In the case of the synthesis of a 2-hydroxy-3-naphthoic acid, it has been found to be preferable to work with a solvent of the present invention which contains 20–30% of free betanaphthol. An example is given below for the preparation of a solution of sodium betanaphtholate in such a mixed solvent.

Example 1

Twenty parts by weight of phenol (a slight excess) are dissolved in 65 parts by weight of dry alphapicoline, and to the mixture 8 parts by weight of sodium hydroxide are added. The mixture is stirred without heating (to avoid the formation of a lower aqueous layer) until all the caustic had dissolved; then the clear solution is heated and the wet picoline distilled and replaced by dry picoline as fast as it distills off. When the boiling point of the distilling vapors remains constant at 129.1°–129.5°, enough dry picoline is added or distilled off to leave a solution of the desired concentration in the reaction vessel.

This clear light brown liquid is a substantially anhydrous solution of sodium phenolate in alphapicoline. $CO_2$ at atmospheric pressure converts it into a soluble phenol carbonic ester at low temperatures, and into sodium salicylate at temperatures close to the boiling point (130°).

Example 2

Eighty parts by weight of phenol (a slight excess) are dissolved in 300 parts of dry alphapicoline, and 45 parts by weight of potassium hydroxide are added. Stirring at room temperature soon brings about a precipitation of the potassium phenolate; the solution is heated to 60°, and in one hour a clear yellow solution is obtained. This is dehydrated by the azotropic distillation of the alphapicoline, dry picoline being gradually added to replace the solvent distilling off. When the boiling point of the distilling vapors remains constant at 129.1°–129.5°, the dehydration is complete. The potassium phenolate, considerably less soluble in the dry solvent, crystallizes out partly when the solution is dehydrated. This solution reacts readily with $CO_2$ to yield potassium salicylate.

Example 3

Fifty-eight parts by weight of alphanaphthol are dissolved in 400 parts by weight of dry pyridine, and 16 parts by weight of sodium hydroxide are added. The mixture is stirred for ½ hour without application of heat and the caustic dissolves, giving a clear light brown liquid. The water formed can be removed by distilling off wet pyridine and replacing it gradually by fresh dry pyridine. The condensation temperature of the distilling vapors rises slowly to 115.2° C. (at 760 mm) where it remains constant, indicating that no more water is left in the reaction vessel with the pyridine. Altogether 400 parts of pyridine are removed by distillation while 200 parts are added, leaving a substantially anhydrous, clear solution of 66.5 parts of sodium alphanaphtholate in 200 parts of pyridine.

This dehydrated solution reacts with carbon dioxide at atmospheric pressure to give nearly quantitative yields of 1-hydroxy-2-naphthoic acid.

Example 4

Fifty-eight parts by weight of betanaphthol are dissolved in 150 parts of pyridine and twenty-two parts of solid caustic potash are added, preferably in powder form. The potash dissolves readily without heating, yielding a clear solution. This solution can be dehydrated by distilling off the wet solvent and gradually replacing it with dry solvent until the condensation point of the distilling vapors ceases to rise. The dry solution so obtained is saturated when 160 parts of pyridine are left. This solution readily yields the insoluble potassium salt of 2,1-hydroxy napthoic acid if treated with $CO_2$ at a temperature of 20° to 60° C.

Example 5

Thirty-six parts by weight of betanaphthol are dissolved in 70 parts of alphapicoline and 10 parts by weight of sodium hydroxide are added. The mixture is stirred in the cold to dissolve the caustic, the last traces being dissolved by gentle heating.

This solution contains one equivalent of water from the reaction. If nine parts by weight of water are added and the solution is cooled, it immediately sets to a cake through a copious precipitation of a sparingly soluble trihydrate of sodium naphtholate. This can be sucked off and dried. It is somewhat hyroscopic and darkens slowly in the air, being attacked by air oxygen.

This same hydrate forms in pyridine, in which solvent it is somewhat more soluble.

Example 6

1,975 parts of caustic soda (95%) and 400 parts of water are melted together in a fusion pot and heated to 305° while stirred. Then 6,540 parts by weight of moist sodium naphthalene-betasulfonate (30% $H_2O$) are added gradually. The melt is kept at 300° for six hours, cooled and ground.

Five parts by weight of this melt are stirred with 10 parts of alphapicoline for 15 minutes at 90°–100°; the sodium naphtholate goes into solution, and the inorganic material—sodium bisulfite and excess caustic—are filtered out. From this solution pure betanaphthol can be recovered by the addition of 0.7 parts by weight of water, which brings about the precipitation of a sparingly soluble hydrate.

For the preparation of carboxylic acids from the melt extract, it is recommended to distill off some of the solvent until the condensation temperature of the distilling picoline vapors remains constant at 129.1° to 129.5°. This operation removes traces of water present in the melt.

Example 7

Eighty-three parts by weight of betanaphthol are dissolved in 200 parts of quinoline, under exclusion of air oxygen, and 16 parts by weight of sodium hydroxide are added and dissolved by heating. A clear solution is obtained.

The water is removed by direct distillation; a little quinoline distills over with the water. When the water has been completely removed, the distilling temperature of the vapors rises rapidly from 100° C. up to 232° C., and then somewhat more slowly to 234° C., where it remains constant. Further distillation gives pure dry quinoline.

This clear yellow solution is substantially anhydrous. It contains an excess of 25 parts by weight of free betanaphthol for the reason explained in the introductory part, and may be used to prepare the 2-hydroxy-1-naphthoic acid or the 2-hydroxy-3-naphthoic acid by reacting it with $CO_2$ at a suitable temperature.

Example 8

One hundred and sixty-five parts of betanaphthol are dissolved in 200 parts of the acid soluble coal tar fraction of the boiling point 240° to 300° C. by means of a little warming. Thirty-two parts of caustic soda are added, and the mixture is heated with stirring until the caustic dissolves completely.

The solution so obtained is light brown and slightly turbid; it contains one equivalent, 14.4 parts by weight, of water. This can be removed by a simple distillation; the water distills first with a little solvent, then pure solvent distills. The dry solution is clear, orange brown. It is a solution in a mixed solvent, containing 50 parts by weight of free naphthol. It will react with $CO_2$ at 250–260°, with or without pressure, to yield 2-hydroxy-3-naphthoic acid.

Example 9

Thirteen parts by weight of 2-hydroxy naphthalene 3-carboxylic acid anilide are dissolved in 150 parts by weight of pyridine. Two parts of powdered sodium hydroxide are added and stirred until the caustic dissolves. The solution is then heated to boiling, and pyridine is distilled off with the water of reaction formed, dry pyridine being added gradually to replace the wet solvent as it distills out. The boiling point of the vapors distilling over rises from 92.5° to 115.2° (at 760 mm.) where it remains constant. Then addition of pyridine is interrupted, and enough dry solvent distilled off or added to leave the desired amount of pyridine. The clear liquid thus obtained is an anhydrous solution of the sodium salt of the anilide in pyridine.

Example 10

Seventy-four parts by weight of 5,6,7,8-tetrahydro-2-naphthol are dissolved in 250 parts by weight of pyridine. Twenty parts by weight of sodium hydroxide are added, and the mixture agitated until the caustic has gone into solution.

Then the solution is heated and the wet pyridine distilled under gradual addition of dry pyridine, until the condensation point of the distilling vapors remains constant at 115.2° (at 760 mm.). This clear, light brown solution will react with $CO_2$ at 160° under pressure to yield the 5,6,7,8-tetrahydro-2-hydroxy-3-naphthoic acid.

We claim:

1. As a new composition of matter a solution of an alkali metal phenolate in a solvent having a major component belonging to the group consisting of pyridine, compounds containing condensed pyridine rings, and their homologs.

2. As a new composition of matter a substantially anhydrous solution of an alkali metal phenolate in a solvent having a major component belonging to the group consisting of pyridine, compounds containing condensed pyridine rings, and their homologs.

3. As a new composition of matter a solution of an alkali metal betanaptholate in a solvent having a major component belonging to the group consisting of pyridine, compounds containing condensed pyridine rings, and their homologs.

4. As a new composition of matter a substantially anhydrous solution of an alkali metal betanaptholate in a solvent having a major component belonging to the group consisting of pyridine, compounds containing condensed pyridine rings, and their homologs.

5. As a new composition of matter a solution of sodium betanaptholate in a solvent containing pyridine as a major component.

6. A new composition of matter according to claim 5 in which the solution is substantially anhydrous.

7. As a new composition of matter a solution of sodium betanaptholate in a solvent containing as a major component an acid soluble mixture of tar bases.

8. A new composition of matter according to claim 7 in which the solution is substantially anhydrous.

9. A method of producing a solution according to claim 1 which comprises bringing about reaction between the phenol and an alkali metal hydroxide in the solvent.

10. A method of preparing solutions of claim 2 which comprises reacting the phenol with an alkali metal hydroxide in the solvent and dehydrating the solution by distilling off the water together with a part of the solvent.

11. A method of preparing a solution of claim 3 which comprises bringing about reaction between betanaphthol and sodium hydroxide in the solvent.

12. A method of preparing a solution of claim 4 which comprises bringing about reaction between betanaphthol and sodium hydroxide in the solvent and dehydrating the solution by distilling off the water together with part of the solvent.

HANS Z. LECHER.
MARIO SCALERA.